United States Patent
Frey

(10) Patent No.: US 9,049,114 B2
(45) Date of Patent: Jun. 2, 2015

(54) NETWORK ACCESS DEVICE AND METHOD FOR AUTOMATICALLY ESTABLISHING CONNECTION TO A WIDE AREA NETWORK

(71) Applicant: CISCO TECHNOLOGY, INC., San Jose, CA (US)

(72) Inventor: Clifford A. Frey, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 172 days.

(21) Appl. No.: 13/690,277

(22) Filed: Nov. 30, 2012

(65) Prior Publication Data
US 2014/0064149 A1    Mar. 6, 2014

Related U.S. Application Data

(60) Provisional application No. 61/695,994, filed on Aug. 31, 2012.

(51) Int. Cl.
*H04L 12/24* (2006.01)
*H04L 12/26* (2006.01)

(52) U.S. Cl.
CPC ........ *H04L 41/0806* (2013.01); *H04L 41/0869* (2013.01); *H04L 41/0886* (2013.01); *H04L 43/50* (2013.01)

(58) Field of Classification Search
CPC . H04L 41/0869; H04L 41/0806; H04L 43/50; H04L 41/0886; H04L 41/046; H04L 49/70; H04L 41/0893; H04L 41/0803; H04L 61/103; H04L 41/084; H04L 12/2418; H04L 41/0853; H04L 61/2015; H04L 12/2697; H04L 12/2856; H04L 12/2881; H04L 12/4641; H04L 12/4645; H04L 12/467; H04L 12/5692; H04L 12/5835; H04L 12/5855; H04L 29/12; H04L 29/12028; H04L 29/12226; H04L 29/12264; H04L 29/12839; H04L 29/12933; H04L 29/12952; H04L 41/0213; H04L 41/08; H04L 41/5022; H04L 41/5051; H04L 41/5087; H04L 45/04; H04L 49/354; H04L 49/555; H04L 51/066; H04L 61/2046; H04L 61/6022; H04L 61/6068; H04L 61/6077; H04L 63/0209; H04L 63/0227; H04L 63/0272; H04L 63/101; H04L 63/102; H04L 63/105; H04L 63/1433; H04L 63/1441; H04L 63/1466; H04L 63/162; H04L 63/164; H04L 63/20; H04L 67/303; G06F 15/177
USPC ........ 370/255, 256, 252, 241, 242, 244, 250, 370/336, 338, 351, 352, 356, 389, 392, 370/395.53, 397, 399, 401, 409, 419; 709/220, 245, 206, 221, 223, 224, 225, 709/226, 227, 228, 229; 707/780, E17.014; 726/1, 11, 13, 15, 2, 22, 23, 24, 25, 26, 726/3, 5, 7, 8
See application file for complete search history.

(56) References Cited

U.S. PATENT DOCUMENTS 7,991,859 B1 * 8/2011 Miller et al. .................. 709/220
2008/0285483 A1   11/2008 Gil et al.
(Continued)

OTHER PUBLICATIONS

U.S. Appl. No. 13/350,736, filed Jan. 13, 2012, 57 pages.
(Continued)

*Primary Examiner* — Bob Phunkulh
*Assistant Examiner* — Rose Clark
(74) *Attorney, Agent, or Firm* — Novak Druce Connolly Bove + Quigg LLP

(57) ABSTRACT

A network access device (NAD) is configured to automatically establish a connection to a WAN. The NAD tests IP configurations according to a first priority scheme at least until a currently best scoring one of the IP configurations is selected for use to communicate over the WAN. The testing of the IP configurations includes transmitting requests according to a first priority scheme and tracking any replies reflecting which IP configurations are valid. The first priority scheme is for selecting among IP configurations for testing and prioritizing a first type of IP configuration over a dynamically determined type of IP configuration. Which IP configurations of the dynamically determined type that are to be tested are determined by attempting to obtain DHCP leases using different VLAN IDs according to a second priority scheme of VLAN IDs to include in DHCP requests.

37 Claims, 9 Drawing Sheets

(56) References Cited

U.S. PATENT DOCUMENTS

| | | | |
|---|---|---|---|
| 2008/0285575 | A1 | 11/2008 | Biswas et al. |
| 2008/0288614 | A1 | 11/2008 | Gil et al. |
| 2008/0294759 | A1 | 11/2008 | Biswas et al. |
| 2008/0304427 | A1 | 12/2008 | Biswas et al. |
| 2010/0228837 | A1* | 9/2010 | Squire et al. ............. 709/220 |
| 2012/0311184 | A1* | 12/2012 | Yamada ................. 709/245 |
| 2013/0097335 | A1* | 4/2013 | Jiang et al. ............... 709/245 |
| 2013/0151676 | A1* | 6/2013 | Thakkar et al. .......... 709/220 |

OTHER PUBLICATIONS

"Cisco Network Assistant Quick Tips," 2005, 22 pages, Cisco Systems, Inc., downloaded from http://www.cisco.com/en/US/prod/collateral/netmgtsw/ps6504/ps5931/prod_white_paper0900aecd802d1b95.pdf on Nov. 28, 2012.

"Clustering Switches," Jun. 2003, 24 pages, Catalyst 2940 Switch Software Configuration Guide, Cisco IOS Release 12.1(13)AY, Chapter 5, Cisco Systems, Inc., downloaded from http://www.cisco.com/en/US/docs/switches/lan/catalyst2940/software/release/12.1_13_ay/configuration/guide/swclus.pdf on Nov. 28, 2012.

"Datasheet, Cloud Management," 6 pages, Meraki, Inc., downloaded from http://www.meraki.com/lib/pdf/meraki_datasheet_cloud_management.pdf on Nov. 28, 2012.

"Datasheet, MS Series," 9 pages, Meraki, Inc., downloaded from http://www.meraki.com/lib/pdf/meraki_datasheet_ms.pdf on Nov. 28, 2012.

"Datasheet, MX Series," 8 pages, Meraki, Inc., downloaded from http://www.meraki.com/lib/pdf/meraki_datasheet_mx.pdf on Nov. 28, 2012.

"Meraki Cloud Controller Product Manual," Dec. 2011, 124 pages, Meraki, Inc.

"Meraki White Paper: Meraki Hosted Architecture," Feb. 2011, 13 pages, Meraki, Inc.

"Meraki Press Releases," Jan. 18, 2012, 3 pages, Meraki, Inc., downloaded from http://www.meraki.com/company/press-releases?uri=2012/01/18/cloud-managed-switches/ on Nov. 28, 2012.

* cited by examiner

NETWORK ACCESS DEVICE AND METHOD FOR AUTOMATICALLY ESTABLISHING CONNECTION TO A WIDE AREA NETWORK

FIELD

This disclosure relates generally to networking and in particular but not exclusively, relates to a network access device establishing a connection to a wide area network.

BACKGROUND

A physical local area network (LAN) may include numerous network access devices (e.g., routers, switches, wireless access points, etc.) that communicate with one another (either directly or indirectly) to provide computing device(s) (e.g., laptops, smartphones, etc.) access to a wide area network (WAN). Thus, a network access device (NAD) is a piece of networking equipment, including hardware and software, which communicatively interconnects other equipment on the LAN (e.g., other network elements, computing devices). The WAN can include, for example, the Internet, where communication with the WAN is through an interface such as T1, T3, cable, Digital Subscriber Line (DSL), wireless (e.g., mobile cell tower), or the like.

The one or more of the network access devices within the LAN that are the last of the network access devices before reaching the WAN (network access devices that are directly coupled to the WAN or directly coupled to an interface device—e.g., a DSL modem) act as a gateway to the WAN (act as a gateway node for the LAN) for other network access devices and network computing devices in the LAN; any network access devices that rely on (communicates with) one or more other network access devices to reach the WAN act as intermediate nodes of the LAN.

When deployed, a conventional network access device must include an Internet Protocol (IP) configuration that allows that network access device to establish a connection to a WAN (communicate with and across the WAN). Determining an IP configuration for a network access device acting as an intermediate node of the LAN may be more challenging because between such an intermediate node and the WAN are one or more other network access devices of the LAN that each have configurations that may impact connectivity to the WAN.

LANs are useful because they are highly customizable to fit the needs of a particular entity. For example, the physical LAN, itself, may be configured to include multiple virtual local area networks (VLANs). A VLAN is a group of network access devices which communicate as if they were attached to the same broadcast domain, regardless of their physical location. A VLAN may have the same attributes as a physical LAN, but allow network computing devices to be grouped together even if they are not directly connected to the same network access device.

Configuring network access devices typically requires manual configuration by an on-site network administrator, engineer, or technician. Also, changes to the access network (e.g., adding/removing network access devices, moving of equipment, regrouping of VLANs, etc.) may require configuration changes to one or more network access devices, which again must be performed on-site. Configuration of network access devices requires a trained network engineer and includes a number of error-prone steps. Incorrect configurations may cause the network access device to lose its connection to the WAN, which can lead to a network outage. Network outages can be difficult and expensive to troubleshoot and result in lost productivity.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DESCRIPTION OF EMBODIMENTS

Figure 1:
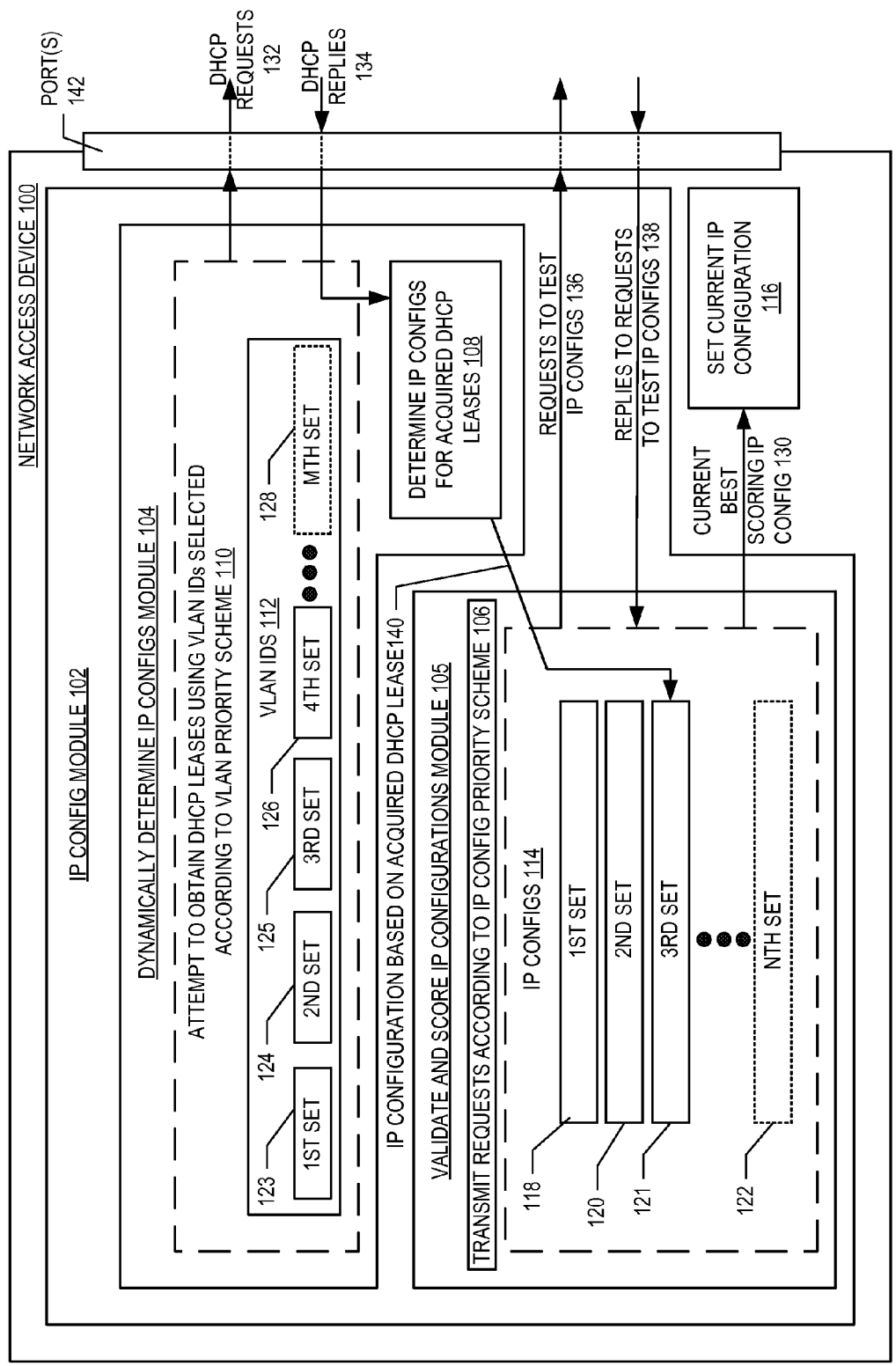
FIG. 1 is a diagram illustrating a mechanism for a network access device to automatically establish a connection to a wide area network, in accordance with an embodiment of the invention.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A network access device (NAD) that automatically establishes a connection to a WAN without the need for local on-site configuration of the NAD is described. In some embodiments, the NAD automatically determines valid Internet protocol (IP) configurations and sets a current IP configuration of the network access device (one used to communicate live traffic with the WAN) to a best scoring one of the valid IP configurations. The time that it takes the NAD to establish a connection to the WAN may further be shortened in some embodiments, where the NAD: 1) uses priority scheme(s) to determine the order in which to test; and 2) performs in parallel the testing of IP configurations and dynamically determining certain of the IP configurations to test.

Embodiments of the present invention may allow for easier installation, configuration, and maintenance of network access devices in a LAN. That is, a network engineer may not be needed onsite to install, configure, or troubleshoot a network access device. Instead, a network access device according to the present disclosure may automatically establish (or re-establish) a connection to the WAN so that a remote network administrator (e.g., using a remote management server over the WAN) may perform the necessary setup and configuration. Thus, certain embodiments disclosed herein may provide for the automation of uplink detection, VLAN detection, IP configuration/detection, identification of misconfigured static IP configurations, and failover provisions if the static IP is misconfigured or not working.

FIG. 1 is a diagram illustrating a mechanism for a network access device 100 to automatically establish a connection to a wide area network, in accordance with an embodiment of the invention. Network access device (NAD) 100 may be a router, a switch, a wireless access point, or any other device that is a NAD of a LAN. As shown in FIG. 1, NAD 100 includes one or more ports 142.

IP configuration module 102 of FIG. 1 illustrates the testing of IP configurations to determine the current best scoring IP configuration 130 to set as the current IP configuration 116 that the network device will use to connect to the WAN (making it the current working IP configuration). An IP configuration, when valid, includes the necessary information for use by NAD 100 to communicate over the WAN (and thus communicate live network traffic with the WAN, including traffic of any downstream NADs and/or computing devices of the LAN). According to one embodiment of the invention, an IP configuration is the combination of a VLAN identifier (ID), an IP address of the NAD, a subnet mask, an IP address of a default gateway, an IP address of a primary Domain Name System (DNS) server, and optionally an IP address of a secondary DNS server. While embodiments of the invention are described herein with reference to IPv4, alternative embodiments of the invention use IPv6 instead of or in addition to IPv4.

The illustrated embodiment of the testing IP configurations 102 includes—(1) a validate and score IP configurations module 105 that validates and scores IP configurations and (2) a dynamically determine IP configurations module 104 that dynamically determines IP configurations to include in a set of the IP configurations to be tested. The validating and scoring of IP configurations 105 includes transmitting requests to test the IP configurations according to the IP configuration priority scheme 106 on one or more of ports 142. The validating and scoring 105 then tracks any replies 138 to the requests 136, which reflect which of the IP configurations are valid.

In some embodiments where NAD 100 is a router or a wireless access point, NAD 100 will typically have a plurality of ports for the LAN and a single uplink port 142 designated for use to establish a connection to the WAN (directly or indirectly), and the requests 136 are sent out only this port. However, in some embodiments where NAD 100 is a network switch, NAD 100 will be deployed as an intermediate node of a LAN and include many ports 142; and any one of a switch's ports may be coupled to the WAN through a series of one or more other network access devices of the LAN (the last of which acts as a gateway to the WAN), and thus the requests 136 are sent out all of these ports; the one of the ports over which a connection to the WAN is actually established is referred to as the current uplink port. In one embodiment wherein the NAD 100 is a network switch, the NAD 100 includes a CPU and a switching fabric, a virtual port allows the CPU of the network switch to transmit network traffic into and receive network traffic from the switching fabric (and thereby, transmit out and receive packets from the other ports subject to the current set of port configurations as described below). Specifically, for each such request 136, the CPU will place in the packet(s) of that request the VLAN ID of the IP configuration being tested.

While in one embodiment the requests to test IP configurations 136 are address resolution protocol (ARP) requests and Domain Name System (DNS) requests, alternative embodiments use more, less, or different types of requests. Specifically, in one embodiment, three types of such messages are used to test an IP configuration's IP addresses (IP address of the NAD, the IP address of a default gateway, the IP address of a primary Domain Name System (DNS) server, and the IP address of any secondary DNS server) and VLAN ID.

A first type of request to test the IP configurations 136 includes testing whether an IP address to be utilized by the NAD 100, per that IP configuration being tested, is available to be used. The address resolution protocol (ARP) requests may be sent for the IP address of the NAD 100 included in the IP configuration that is being tested. If the NAD 100 does not receive an ARP reply to this ARP request then the corresponding IP configuration is determined to be potentially valid. However, if NAD 100 does, indeed, receive an ARP reply in response to the ARP request then the IP configuration is marked as invalid and may be discarded from the list of IP configurations to test.

A second type of request to test the IP configurations 136 involves testing whether a gateway address of the IP configuration appears to be valid. Accordingly, ARP requests are sent to the gateway IP address included in the IP configuration being tested to confirm that such a network access device exists. In this case, if the NAD receives an ARP reply to this ARP request, then the corresponding IP configuration is determined to be potentially valid. Similarly, if no ARP reply is returned in response to the ARP request, the IP configuration is determined to be invalid and not further used.

A third type of request used to test the IP configurations 136 involves determining if a Domain Name System (DNS) server indicated by the IP configuration exists and is able to properly determine an IP address of a known device outside the local network (i.e. connected to the WAN). Accordingly, the domain name system (DNS) requests are sent to the DNS server IP address included in the IP configuration being tested to: 1) confirm that such a DNS server exists; and 2) request the IP address of a known host connected to the WAN. NAD 100 then verifies that the IP address returned to NAD 100 in response to the DNS request is the correct IP address. For example, NAD 100 may be pre-programmed with the IP address of a management server (not shown in FIG. 1) that is connected to the WAN for providing remote management for NAD 100 over the WAN, where the request to test IP configurations 136 is a DNS request sent to the management server asking for the IP address of a domain name of that management server (e.g. "server1.managementserver.com").

Each of the above request types also tests the IP configuration's VLAN ID, since an improper VLAN ID in such requests will cause that request to be blocked. For instance, each of a network switch's ports has a current port configuration that identifies a set of zero or more VLAN IDs, and network traffic must meet the current port configuration of the ports on which that network traffic is received and transmitted to avoid the network traffic from being blocked at that port; that is, network traffic meeting the current port configuration of the receiving port and transmitting port will be communicated through the switch. Port configurations generally come in three types: a trunk port type that typically leads to another network access device such as a switch or router; an access port type that is connected to a computing device/end station device such as a server or workstation; and a hybrid port type that can flexibly be connected to either a network access device or end station device. Each port configuration includes one or more of the following: a port number of a respective port, a set of permissible VLAN IDs for that port (commonly for trunk ports and hybrid ports), a native VLAN ID (commonly for access ports and hybrid ports), an 'enabled' flag indicating whether the port is to be utilized, a configured speed indicating a maximum amount of data that is allowed to pass through the port over a period of time, and a configured duplex setting indicating whether the port is to operate at half or full duplex. In the case of configured speed and duplex, the port configuration value may be set to 'AUTO', indicating whether the switch should automatically negotiate or determine a proper value on its own (While one embodiment is described with separate speed and duplex and treats these separately, alternative embodiments treat these together as one unit). By way of example, assume a given request to test a given IP configuration with a specific VLAN ID is sent by the CPU of a network switch to the switching fabric of that network switch for transmission out all of the network switch's ports, that given request will only be communicated through the ports of the network switch whose current port configurations allow for that specific VLAN ID (any of the network switch's ports whose current port configuration does not allow for that specific VLAN ID will be blocked by the switching fabric).

Thus, in some embodiments, if all three of the above type requests are sent out for a given IP configurations (make it out a port) and correct replies are received, then the IP configuration is determined to be valid.

Numeral 114 illustrates a collection of IP configurations to be tested by NAD 100 to determine their validity and score them. In some embodiments disclosed herein, the testing of IP configurations is done according to an IP configuration priority scheme. That is, certain IP configuration types may be tested before others so as to increase the likelihood that a valid IP configuration will be found in a shorter amount of time, and thus, the quicker NAD 100 can establish a connection to the WAN and reduce "down time." To this end, IP configurations 114 are shown as including several sets of IP configuration, each with zero or more IP configurations (e.g., a first set 118, a second set 120, a third set 121, and an Nth set 122).

Figure 2A:
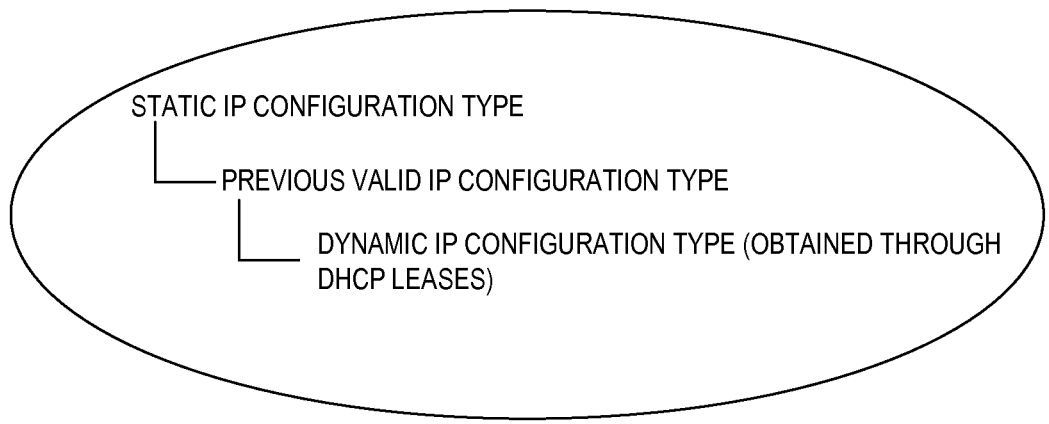
FIG. 2A-B are diagrams respectively illustrating an IP configuration priority scheme and a VLAN priority scheme, in accordance with an embodiment of the invention.

FIG. 2A illustrates one embodiment of a possible IP configuration priority scheme 202. As shown in the embodiment of FIG. 2A, IP configuration priority scheme 202 includes three sets of IP configurations listed from highest to lowest priority order according to the priority scheme 202: a Static IP configuration type (i.e., statically configured IP configuration(s)), a Previous Valid IP configuration type, and a dynamic IP configuration type obtained through dynamic host configuration protocol (DHCP) leases.

Statically configured IP configuration(s) may include an IP configuration that is pre-programmed into NAD 100 during manufacture and/or programmed later (e.g., by the manufacturer after sale and prior to shipment, and/or by a system administrator of the purchaser prior to deployment, prior to redeployment, while deployed, etc.); in one embodiment, placed in the first set 118. In one embodiment, IP configuration(s) of the Previous valid IP configuration type are placed in the second set 120. While in one embodiment the Previous valid IP configuration type is limited to an IP configuration, if any, that was the most recently used by NAD 100 to communicate over the WAN (previously set as the current IP configuration 110, be it a statically configured IP configuration or a dynamic IP configuration), and thus was previously determined by the NAD 100 to be valid (referred to as the most recent working IP configuration); alternative embodiments store one or more other IP configurations that were used prior to the most recently used IP configuration. The dynamic determination of IP configurations (104) for inclusion in the IP configurations 114 is done based on obtained DHCP leases; in one embodiment, these are placed in a third set 121.

In the illustrated example of priority scheme 202, giving any static IP configuration(s) the highest priority assumes that statically configured IP configuration(s) will give the best chance of establishing a valid connection to the WAN. Similarly, prioritizing IP configuration(s) that NAD 100 had previously used give NAD 100 a better chance at establishing connectivity sooner rather than just randomly trying IP configurations. In one embodiment, if a statically configured IP configuration that was determined to be valid is later "erased" by a system administrator, NAD 100 may store that IP configuration as a previously determined valid IP configuration in non-volatile memory of NAD 100 for future use. While a particular priority scheme is illustrated, alternative embodiments may use a different prioritization (e.g., that reorders the IP configuration types differently; that includes more, less, or different IP configuration types).

Figure 3:
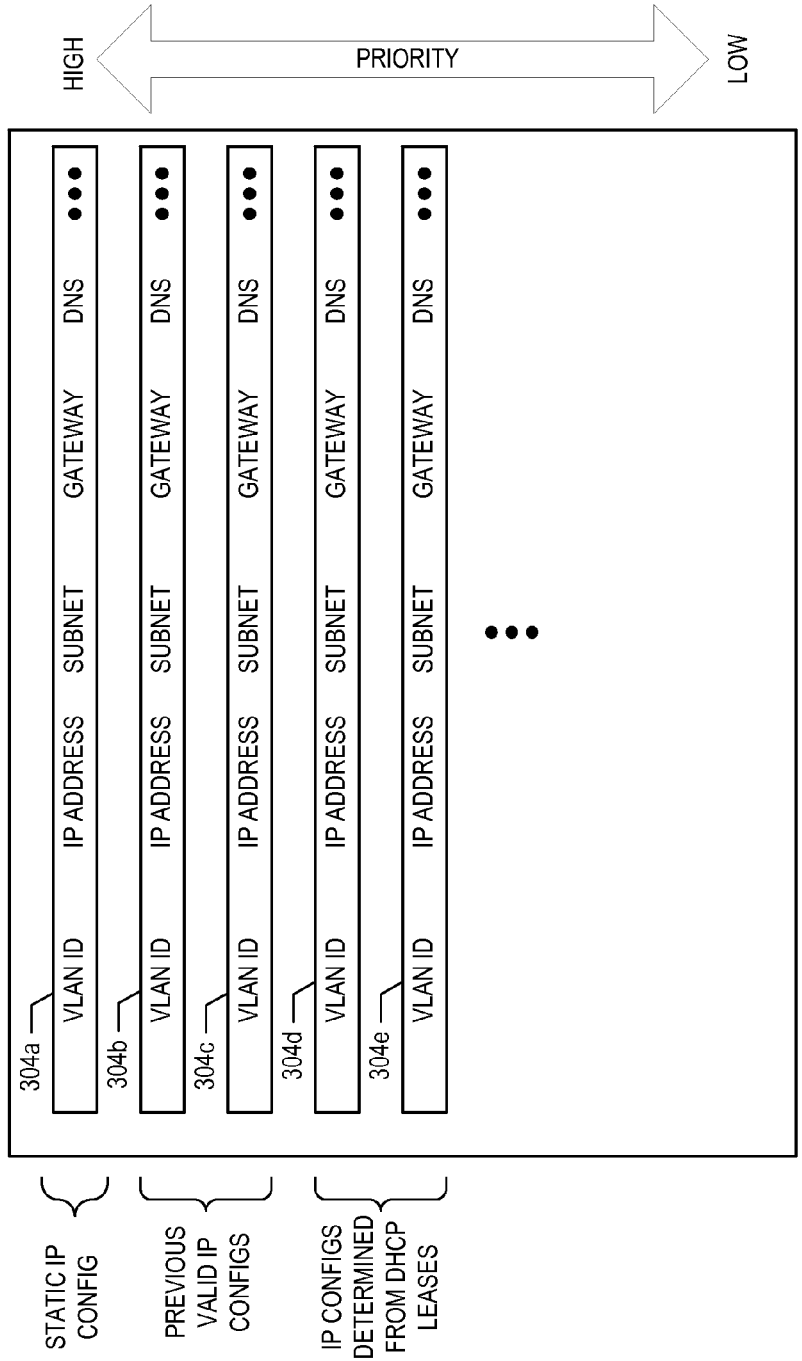
FIG. 3 is a diagram illustrating test IP configurations, in accordance with an embodiment of the invention.

FIG. 3 illustrates one possible implementation of IP configurations to test, which are prioritized according to an IP configuration priority scheme, such as IP configuration priority scheme 202 of FIG. 2A. Thus, the list of IP configurations to test 302 of FIG. 3 includes several IP configurations 304a-e arranged from high priority down to low priority. While in FIG. 2A each entry includes a VLAN ID, an IP address of the NAD, a subnet mask, an IP address of a default gateway, and an IP address of a primary DNS server; alternative embodiments of the invention may also include an IP address of a secondary DNS server, a maximum transmission unit (MTU), a Network Time Protocol (NTP) server, a set of static routes, and Hypertext Transfer Protocol (HTTP) Proxy address. As shown in FIG. 3, statically configured IP configuration 304a is given the highest priority and thus, may be selected by NAD 100 for testing before all the other IP configurations. Also shown in FIG. 3 are previous valid IP configurations 304b and 304c, which are given the next highest priority after the static IP configuration(s) (in embodiments where the previous valid IP configuration type is limited to the most recent working IP configuration, there would only be one previous valid IP configuration). In the illustrated embodiment of IP configurations to test 302, the IP configurations (302d and 302e) determined from DHCP leases are given the lowest priority when compared with the other sets of IP configurations implemented in this embodiment.

While embodiments are described that group the IP configurations into three sets, alternative embodiments may have more, less, or different sets.

The time that it takes the NAD to establish a connection to the WAN may further be shortened in some embodiments, where the NAD tests IP configurations (validate and score IP configurations module 105) and dynamically determines a set of IP configurations to test (dynamically determine IP configurations module 104) in parallel (that is, the they overlap in time at least partially). That is, the dynamically determining of a set of IP configurations to test may occur concurrently with the testing of IP configurations. For example, if the NAD includes statically configured IP configuration(s) the NAD may begin testing those, while at the same time the NAD is attempting to obtain DHCP leases to dynamically determine another set of IP configurations to test.

Also, the list of IP configurations to test 302 may be dynamic. That is, newly discovered higher priority IP configurations may be inserted into the list according to its priority rather than at the end of the list. Also, NAD 100 may continue to determine IP configurations from obtained DHCP leases and add those to the list of IP configurations 302, even when NAD 100 has already begun testing other IP configurations.

Those IP configurations that NAD 100 determines to be valid are scored. In one embodiment, the scoring of IP configurations is similar to the IP configuration priority scheme. That is, statically configured IP configurations may be assigned a better score than non-statically configured IP configurations. Similarly, IP configurations previously determined to be valid may score better than the IP configurations dynamically generated based on obtained DHCP leases.

As discussed above, numeral 116 of FIG. 1 illustrates setting the current IP configuration to the current best scoring IP configuration 130 (making it the current working IP configuration). In one embodiment, NAD tests IP configurations until a best scoring IP configuration (130) is found and then sets the current IP configuration (116) of NAD 100. NAD 100 may then cease the testing of the IP configurations to test (e.g., IP configurations 114). However, in another embodiment, NAD 100 may continue searching for a higher scoring IP configuration, even after a valid IP configuration is found and the current IP configuration of NAD 100 set. Thus, in this embodiment, as NAD 100 determines that an IP configuration is valid its score may be compared with that of the current IP configuration of NAD 100. If the tested IP configuration's score is higher than the score of the current IP configuration of NAD 100 then the current IP configuration is replaced with the higher scoring IP configuration. In one embodiment, NAD 100 continues searching for a higher scoring IP configuration for a predetermined time. In yet another embodiment, NAD 100 continues searching for a higher scoring IP configuration until the list of IP configurations to test 114 is exhausted.

In some embodiments, NAD 100 periodically tests the current IP configuration of NAD 100 to determine whether the current IP configuration is still valid. If NAD 100 determines that the current IP configuration is not valid, then the current IP configuration may be replaced with the next best scoring valid IP configuration from the list of IP configurations 114. This may provide for failover protection should a static or other IP configuration be misconfigured or if there is a change in the upstream network that causes NAD 100 to lose its connectivity to the WAN.

As mentioned above, NAD 100 may be configured for remote management over the WAN by a management server (not shown in FIG. 1). In one embodiment, if NAD 100 includes a statically configured IP configuration and the current IP configuration is not the statically configured IP configuration, NAD 100 may be configured to transmit data (e.g., error message, flag, warning, status, etc.) to the management server over the WAN to indicate that the current IP configuration is different than the statically configured IP configuration. Such an indication to the management server may serve to notify a system administrator that the statically configured IP configuration was incorrect, or that there was a fault, or change in the network, upstream from NAD 100.

As mentioned above, in addition to the transmitting of requests according to an IP configuration priority scheme, the testing of IP configurations 102 includes dynamically determining IP configurations 104 based on obtained DHCP leases. In the illustrated embodiment of FIG. 1, attempting to obtain DHCP leases (110) includes transmitting DHCP requests 132 using different VLAN IDs (112) selected according to the VLAN priority scheme. In response to any DHCP leases that are indeed obtained by the NAD as a result of the DHCP requests (132) and DHCP replies (134) thereto, the NAD determines IP configurations (108) for inclusion in the IP configurations 114. That is, IP configurations based on the acquired DHCP leases 140 are added to the list of IP configurations 114 to test. As will be apparent from the description below, the NAD 100 attempts to obtain DHCP leases as a way to test whether the VLAN IDs are valid so that NAD 100 can determine which VLAN IDs to include in the IP configurations to test. VLAN IDs 112 are shown as including several sets of VLAN IDs, each with zero or more VLAN IDs (e.g., a first set 123, a second set 124, a third set 125, a fourth set 126, and an Mth set 128).

Figure 2B:
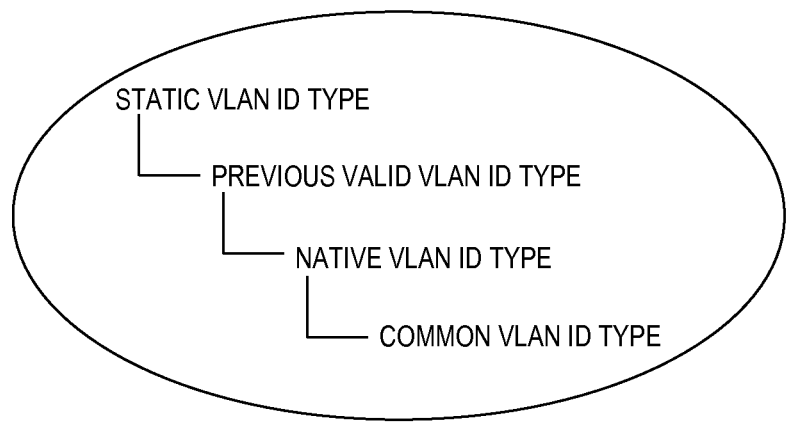

FIG. 2B illustrates an embodiment of one possible VLAN priority scheme 204. As shown in the embodiment of FIG. 2B, VLAN priority scheme 204 includes four VLAN ID types listed from most to least favored: a static VLAN ID type, then a previous VLAN ID type, then a native VLAN ID type (native VLAN IDs), and then a commonly used VLAN ID type (commonly used VLAN IDs). Statically configured VLAN IDs may include those that are pre-programmed into NAD 100 during manufacture and/or may also include desired or preferred VLAN IDs stored in non-volatile memory of NAD 100 by a system administrator (e.g., VLAN IDs of any static IP configurations 304a stored in the IP configurations to test 302 in FIG. 3); in one embodiment, placed in the first set 123. In one embodiment, VLAN ID(s) of the Previous valid VLAN ID type are placed in the second set 124. While in one embodiment the Previous valid VLAN ID type is limited to a VLAN ID, if any, that was the most recently used by NAD 100 to communicate over the WAN, and thus was previously determined by the NAD 100 to be valid (referred to as the most recent working VLAN ID, be it a static VLAN ID, a native VLAN ID, or a commonly used VLAN ID); alternative embodiments store one or more other VLAN IDs that were used prior to the most recently used VLAN ID). Thus, in some embodiments, once NAD 100 determines that a particular VLAN ID is valid and uses it in an IP configuration during operation for communicating network traffic or otherwise over the WAN, it may store that VLAN ID in non-volatile memory (e.g., VLAN IDs of any previous working IP configurations 304b-c stored in the IP configurations to test 302 in FIG. 3). The Native VLAN ID for a router is stored in non-volatile memory of the router (and in some embodiments, configurable), whereas for a switch a set of zero or more native VLAN IDs is created using any native VLAN IDs listed in the current set of port configuration (access and hybrid type port configurations). In one example, the native VLAN ID may be VLAN 1; in one embodiment, placed in the third set 125. A list of commonly used VLAN IDs may be pre-programmed into the network access device either during manufacture, or by a system administrator prior to deployment of NAD 100 (commonly used VLAN IDs for a router are stored in non-volatile memory of the router (and in some embodiments, configurable), whereas for a switch a set of zero or more commonly used VLAN IDs is created using any permissible VLAN IDs listed in the current set of port configuration (trunk or hybrid type port configurations)); in one embodiment, placed in the fourth set 126.

Thus, in one example, DHCP requests using the statically configured VLAN ID(s) are transmitted before other types of VLAN IDs. In another example, DHCP requests using native VLAN IDs are transmitted before DHCP requests using the predetermined common VLAN IDs.

Similar to the IP configuration priority scheme of FIG. 2A, prioritizing the VLAN IDs for transmitting in DHCP requests (132) may decrease the time that it takes NAD 100 to establish a connection to the WAN to reduce "down time" of the device. In the illustrated example of the VLAN ID priority scheme in FIG. 2B, giving static VLAN ID(s) the highest priority assumes that IP configurations using the statically configured VLAN ID(s) will give the best chance of establishing a valid connection to the WAN. Similarly, prioritizing VLAN IDs that NAD 100 had previously used give NAD 100 a better chance at establishing connectivity sooner rather than just randomly trying VLAN IDs.

In some embodiments, NAD 100 transmits DHCP requests 132 in parallel. That is, NAD 100 may transmit a DHCP request a predetermined time after sending a previous DHCP request and before a response to the previous DHCP request is expected to be received by NAD 100. Thus, NAD 100 may be configured to not wait for a reply to a DHCP request before sending out the next DHCP request. In doing so, NAD 100 may obtain DHCP leases quicker and thus determine IP configurations to test in less time.

Figure 4:
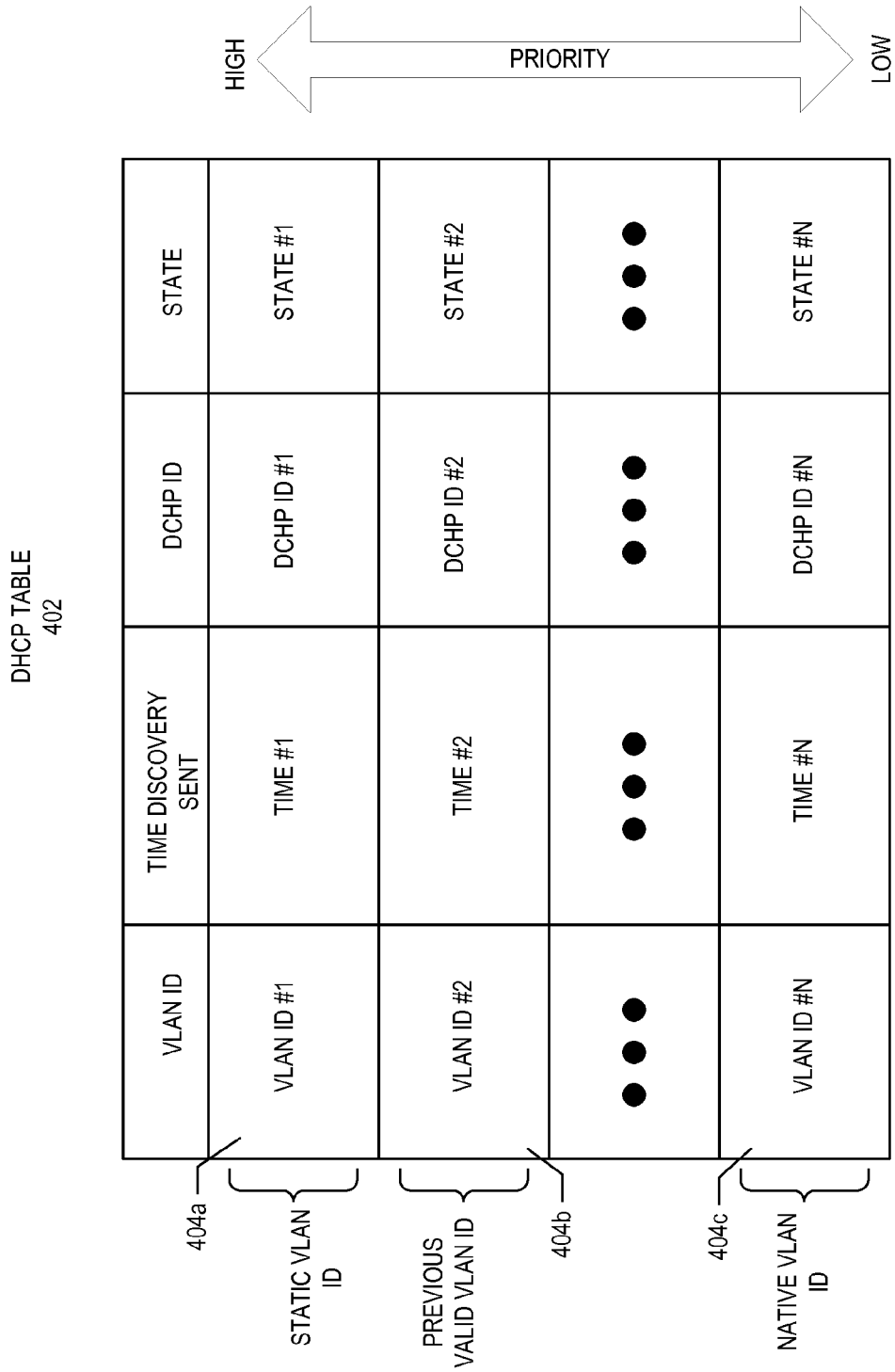
FIG. 4 is a diagram illustrating a DHCP table, in accordance with an embodiment of the invention.

Turning now to FIG. 4, a DHCP table 402 is illustrated as a way to maintain the status of the multiple DHCP requests transmitted in parallel. As shown, entries 404*a-c* are prioritized according to a VLAN priority scheme, such as VLAN priority scheme 204 of FIG. 2B. Thus, the DHCP table 402 indicates DHCP requests transmitted according to their priority, where DHCP requests with higher priority VLAN IDs (e.g., static VLAN IDs) are transmitted before DHCP request of lower priority VLAN IDs (e.g., native VLAN IDs). In the illustrated example of DHCP table 402, each entry includes the VLAN ID, the time the discovery request was sent, a DHCP ID number, and the current state of the DHCP request. Any DHCP requests 132 that do not result in a DHCP lease may be removed from DHCP table 402 and that particular VLAN ID is determined to be invalid.

While a particular priority scheme is illustrated, alternative embodiments may use a different prioritization (e.g., that reorders the VLAN ID types differently; that includes more, less, or different VLAN ID types). Also, while embodiments are described that group the VLAN IDS into four sets, alternative embodiments may have more, less, or different sets.

In one embodiment, NAD 100 continues adding IP configurations to the third set 121 of IP configurations to test even after the transmitting of requests according to the IP configuration priority scheme has begun. That is, NAD 100 may continue determining a set of IP configurations to test at the same time that NAD 100 is transmitting the requests to test IP configurations 136. Determining the dynamically generated IP configurations "concurrently" with the transmitting of the requests to test IP configurations 136 may further reduce the time that it takes NAD 100 to establish a connection to the WAN.

Figure 5:
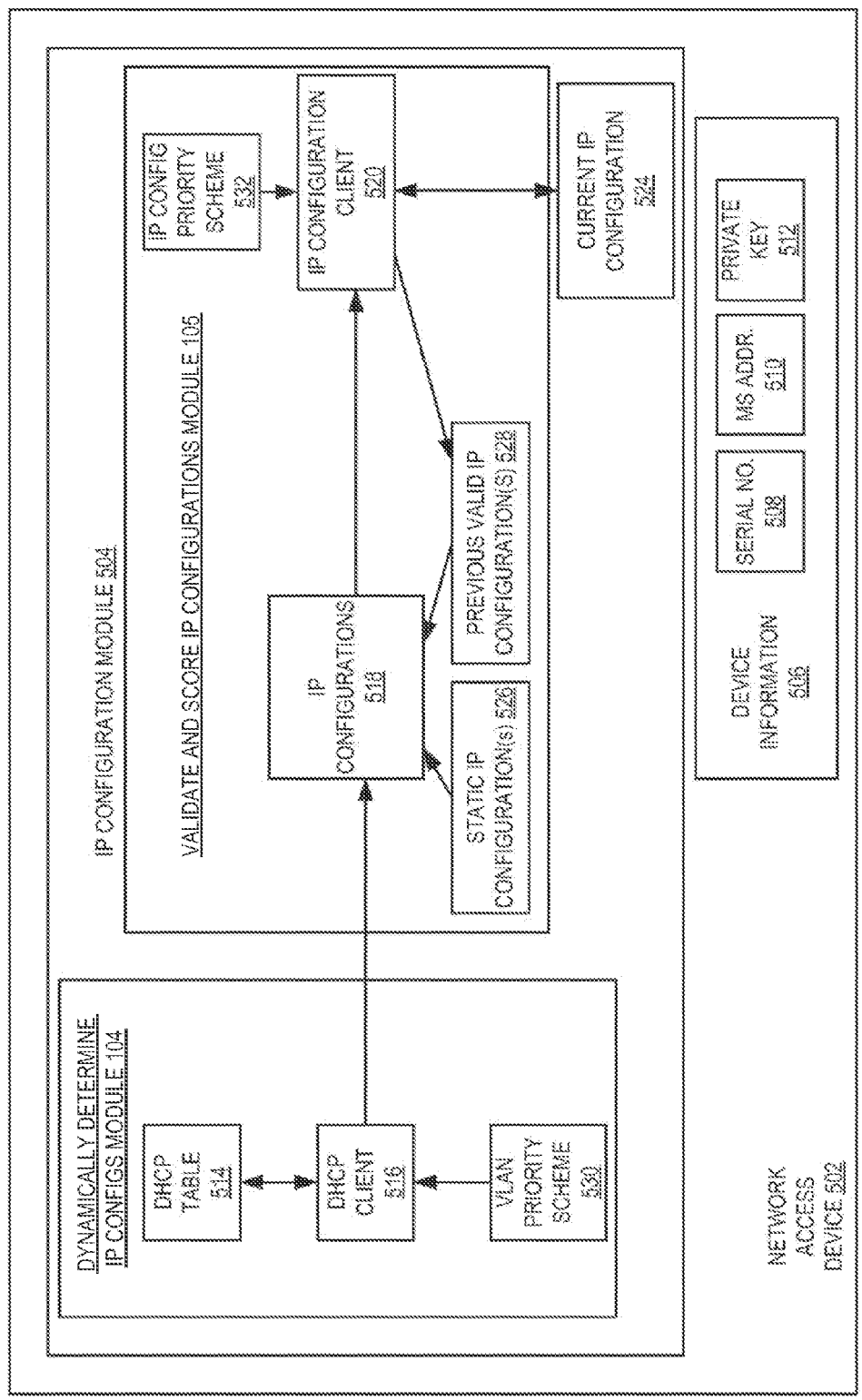
FIG. 5 is a block diagram illustrating a network access device, in accordance with an embodiment of the invention.

FIG. 5 is a block diagram illustrating a network access device 502, in accordance with an embodiment of the invention. Network access device 502 is one possible implementation of network access device 100 of FIG. 1. In the illustrated example, network access device 502 includes an IP configuration module 504 and device information 506. For the purposes of this discussion, NAD 502 is a network administered device, to be administered via a management server over a WAN (e.g., the Internet). It is assumed that an administrator associated with network access device 502 has registered network access device 502 with the management server (see discussion of management server below with reference to FIGS. 8 and 9). Thus, device information 506 may include static information such as a serial number 508 that is unique to network access device 502, the management server (MS) address 510 (i.e., IP address), and a private key 512 to allow the management server to authenticate network access device 502. IP configuration module 504 is shown as including dynamically determined IP configurations module 104 (including a DHCP table 514, a DHCP client 516, and a VLAN priority scheme 530), a validate and score IP configurations module 105 (including a set of test IP configurations 518, an IP configuration client 520, a set of previous valid IP configuration(s) 528, static IP configuration(s) 526, and an IP configuration priority scheme 532), and a current IP configuration 524.

Figure 6:
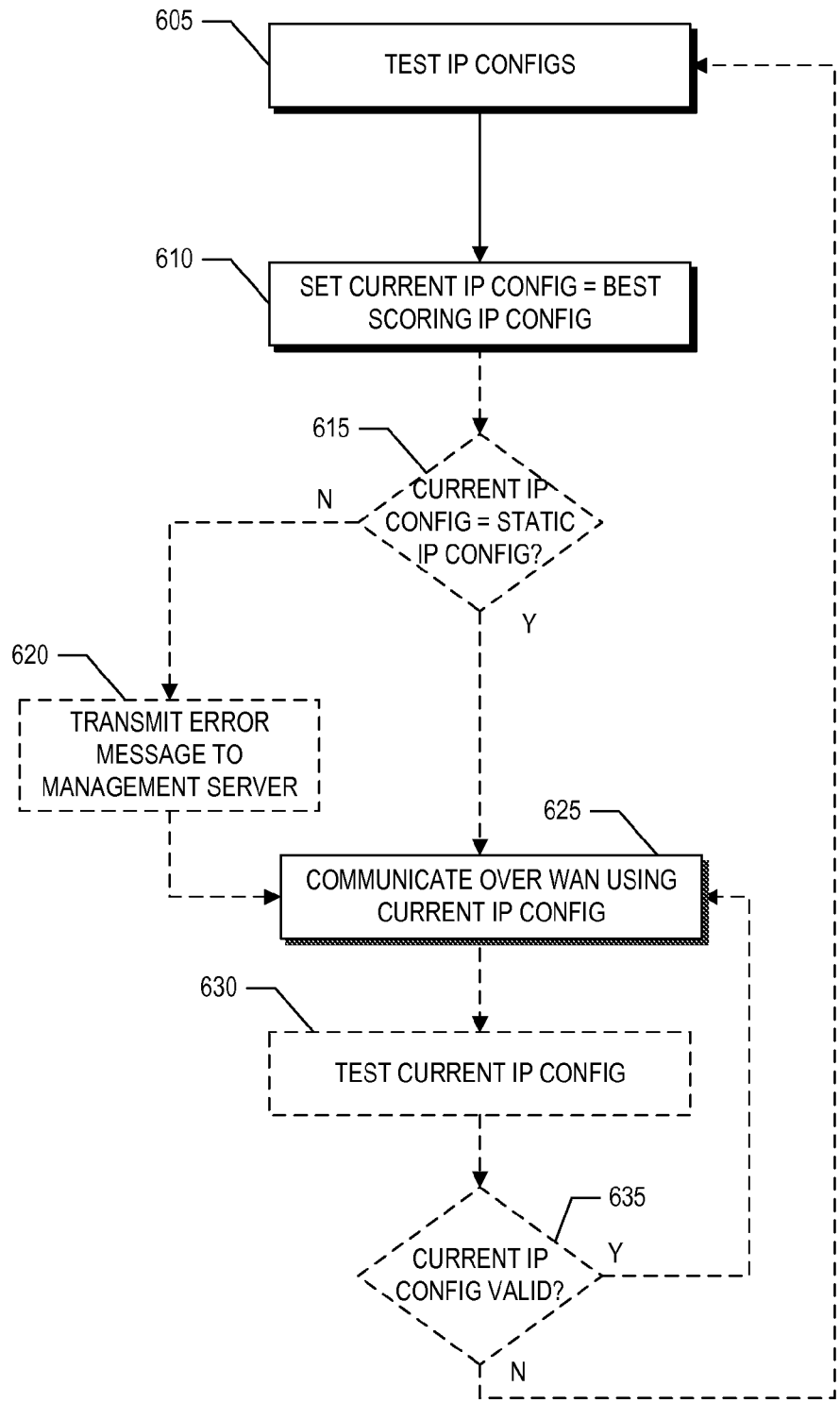
FIG. 6 is a flow diagram illustrating a process of automatically establishing a connection to a wide area network, in accordance with an embodiment of the invention.

The operation of NAD 502 will now be described with reference to FIG. 5 and with reference to the flow diagrams of FIGS. 6 and 7. In process block 605 of FIG. 6, IP configuration module 504 tests IP configurations 518. In one embodiment, IP configuration module 504 tests IP configurations 518 at least until a currently best scoring of IP configurations 518 is found; an example flow is described later with reference to FIG. 7.

In process block 610, IP configuration client 520 sets the current IP configuration 524 to the current best scoring of IP configurations 518. Prior to overwriting the IP configuration in the current IP configuration 524, IP configuration module 504 may also copy that IP configuration (as the most recent working IP configuration) to the previous valid IP configuration(s) 528 for future use (in embodiments where the previous valid IP configuration type includes only the most recent working IP configuration, then what was stored in the previous valid IP configuration(s) 528 is overwritten).

In an optional decision block 615, if the current IP configuration is not a statically configured IP configuration 526, then NAD 502 transmits an error message to the management server over the WAN in process block 620. As mentioned above, transmitting an error message such as this may serve to notify a system administrator that the statically configured IP configuration was incorrect, or that there was a fault, or change in the network, upstream from NAD 502. Next, in process block 625 network access device 502 begins communicating over the WAN. Communicating over the WAN includes providing downstream devices (e.g., downstream computing devices (i.e., client device) or other downstream network access devices) access to the WAN by communicating live network traffic; and may also include NAD 502, itself communicating with the management server over the WAN for further configuration of NAD 502. In one embodiment, if the current IP configuration 524 is not a statically configured IP configuration 526 then NAD 502 may restrict or prevent downstream devices from accessing the WAN, but still allow communication between the NAD 502, itself and a management server over the WAN, so as to allow a system administrator to reconfigure the static IP configuration 526 or at least verify that the current IP configuration 524 automatically set by NAD 502 is approved for use for communicating network traffic over the WAN.

As shown in process block 630 and decision block 635, NAD 502 may optionally periodically test the current IP configuration 524 to verify that it is still valid (i.e., that NAD 502 still has access to the WAN). The testing of the current IP configuration 524 in process block 630 may performed in a similar manner as previously described; that is, using the current IP configuration 524 to transmit an ARP request and responding appropriately to any reply; and/or using the current IP configuration 524 to send a DNS to a known host (e.g., the Management server IP address as stored in Management server address 510 of FIG. 5) and responding appropriately to a reply.

Figure 7:
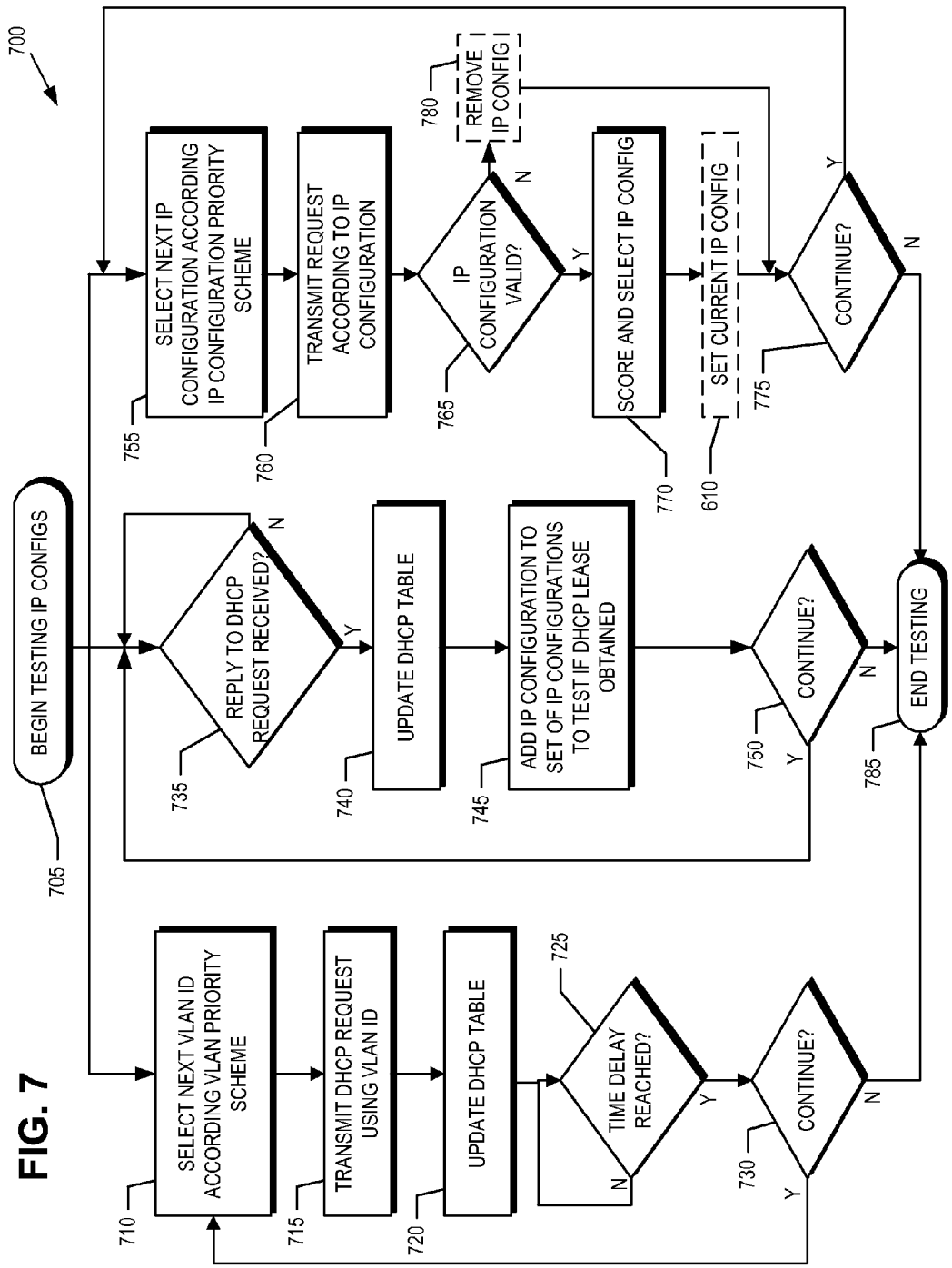
FIG. 7 is a flow diagram illustrating a process of testing IP configurations, in accordance with an embodiment of the invention.

FIG. 7 is a flow diagram illustrating a process 700 of testing IP configurations, in accordance with an embodiment of the invention. Process 700 is one possible implementation of process block 605 of FIG. 6. As shown in the embodiment of process 700, the testing of IP configurations may include several processes performed in parallel. For example, process blocks 710-730 illustrate the transmitting of DHCP requests using different VLAN IDs, while blocks 735-750 illustrate the monitoring of replies to the DHCP requests and determining IP configurations to add to IP configurations to test (e.g., IP configurations 518), and process blocks 755-775 illustrate the transmitting of requests to test which of the IP configurations are valid. Thus, in this embodiment, NAD 502 does not need to wait for replies to the DHCP requests before transmitting further DHCP requests and also does not need to wait until the list of IP configurations to test 518 is completed before beginning the determining of which IP configurations are valid. This parallel nature of process 700 may reduce the time that it takes the NAD 502 to establish a connection to the WAN.

Process 700 begins the testing of IP configurations at process block 705. In process block 710, DHCP client 516 selects a next VLAN ID according to VLAN priority scheme 530. In one embodiment, VLAN priority scheme 530 is implemented as VLAN priority scheme 204 of FIG. 2B. In process block 715, DHCP client 516 transmits a DHCP request using the selected VLAN ID and then updates DHCP table 514 in process block 720. By way of example, DHCP table 514 may be implemented as DHCP table 402 of FIG. 4. Thus, DHCP client 516 may update DHCP table 514 by adding an entry, such as entry 404a in FIG. 4. Next in decision block 725, DHCP client 516 institutes a time delay before proceeding. In one embodiment, the time delay is a predetermined time that helps to prevent flooding of the network with a large number of DHCP requests at the same time. However, the time delay may also be shorter than the time expected for a typical reply to a DHCP request. That is, DHCP client 516 may transmit a DHCP request a predetermined time after sending a previous DHCP request before a reply to the previous DHCP request is expected to received by NAD 502. By way of example, the time delay may be short enough, such that DHCP client 516 transmits a DHCP request about once every second. The transmitting of DHCP requests in such short succession may further reduce the time that it takes NAD 502 to find valid VLAN IDs, and thus, shorten the time it takes NAD 502 to establish a connection to the WAN.

In decision block 730, it is determined whether DHCP client 516 should continue transmitting DHCP requests. As mentioned above, in one embodiment, if IP configuration module 504 finds a valid IP configuration the testing of further IP configurations may stop. In another embodiment, IP configuration module 504 may continue testing for a predetermined time or until there are no further IP configurations to test. In either case, if it is determined to continue testing in decision block 730, process 700 returns to process block 710 to select the next VLAN ID for testing. Otherwise, process 700 proceeds to block 785 where the testing of IP configurations ends.

Turning now to decision block 735, DHCP client 516 performs the monitoring of any replies to the DHCP requests. If a DHCP reply is indeed received, DHCP client 516 updates DHCP table 514 (e.g., state field of DHCP table 402). Next, in process block 745, if the DHCP reply indicates that a DHCP lease is obtained, DHCP client 516 determines an IP configuration and adds the IP configuration to the set of IP configurations to test 518. In decision block 750, it is again determined whether testing of IP configurations should continue. If so, process 700 returns to decision block 735 to again monitor any replies to the DHCP requests.

The transmitting of requests to test IP configurations begins in process block 755. In process block 755, IP configuration client 520 selects a next IP configuration to test from the IP configurations 518 according to IP configuration priority scheme 532. In one embodiment, IP configuration priority scheme 532 is implemented as IP configuration priority scheme 202 of FIG. 2A. The list of IP configurations 518 may be implemented similarly to list 302 of FIG. 3.

Similar to the transmitting of requests to test the IP configurations discussed above, process block 760 may include IP configuration client 520 transmitting ARP requests using the IP address of NAD 502 or the IP address of a second network access device as indicated in the IP configuration being tested. In one embodiment, process block 760 includes IP configuration client 520 transmitting a DNS request to a known host connected to the WAN, such as the management server, using the IP configuration being tested. Next, in decision block 765, if the IP configuration is determined to be invalid, then in optional process block 780, IP configuration client 520 may remove the invalid IP configuration from the list of IP configurations to test 518.

While in one embodiment the requests to test the selected IP configuration and the resulting decision regarding validity is completed before the next IP configuration is selected, alternative embodiments may be implemented in a similar fashion to the time delay/parallel manner of the DHCP request/reply flows for block 710-725 and blocks 735-745. Specifically, the time delay before sending the next request to test an IP configuration may be shorter than the time expected for a typical reply or lack thereof to such a request (before a reply to the previous request is expected to received by NAD 502).

In process block 770, IP configuration client 520 assigns a score and selects a currently best scoring IP configuration. FIG. 7 also illustrates that once the currently best scoring IP configuration is selected, process 700 may return to process block 610 of FIG. 6. That is, in this embodiment, the testing of IP configurations may end once the currently best scoring IP configuration is selected (e.g., select the first IP configuration as soon as it is validated and stop testing further IP configurations). However, alternative embodiments may operate differently (e.g., continue testing IP configurations for a predetermined time replacing the current IP configuration as better scoring IP configurations are found; select a lower priority IP configuration only after any static IP configuration are tested and determined to be invalid; select a lower priority IP configuration only after a predetermine period of time in which any static IP configurations repeatedly tested and none are found valid, etc.). Further, if a lower priority IP configuration is selected and at a later time a static IP configuration is tested and determined valid, then the previously selected lower priority IP configuration is replaced because the valid static IP configuration is chosen as the current best scoring IP configuration 130

In decision block 775, process 700 determines whether testing of IP configurations should continue. If so, process 700 returns to process block 755 to begin transmitting another request to test the next IP configuration according to IP configuration priority scheme 532.

Figure 8:
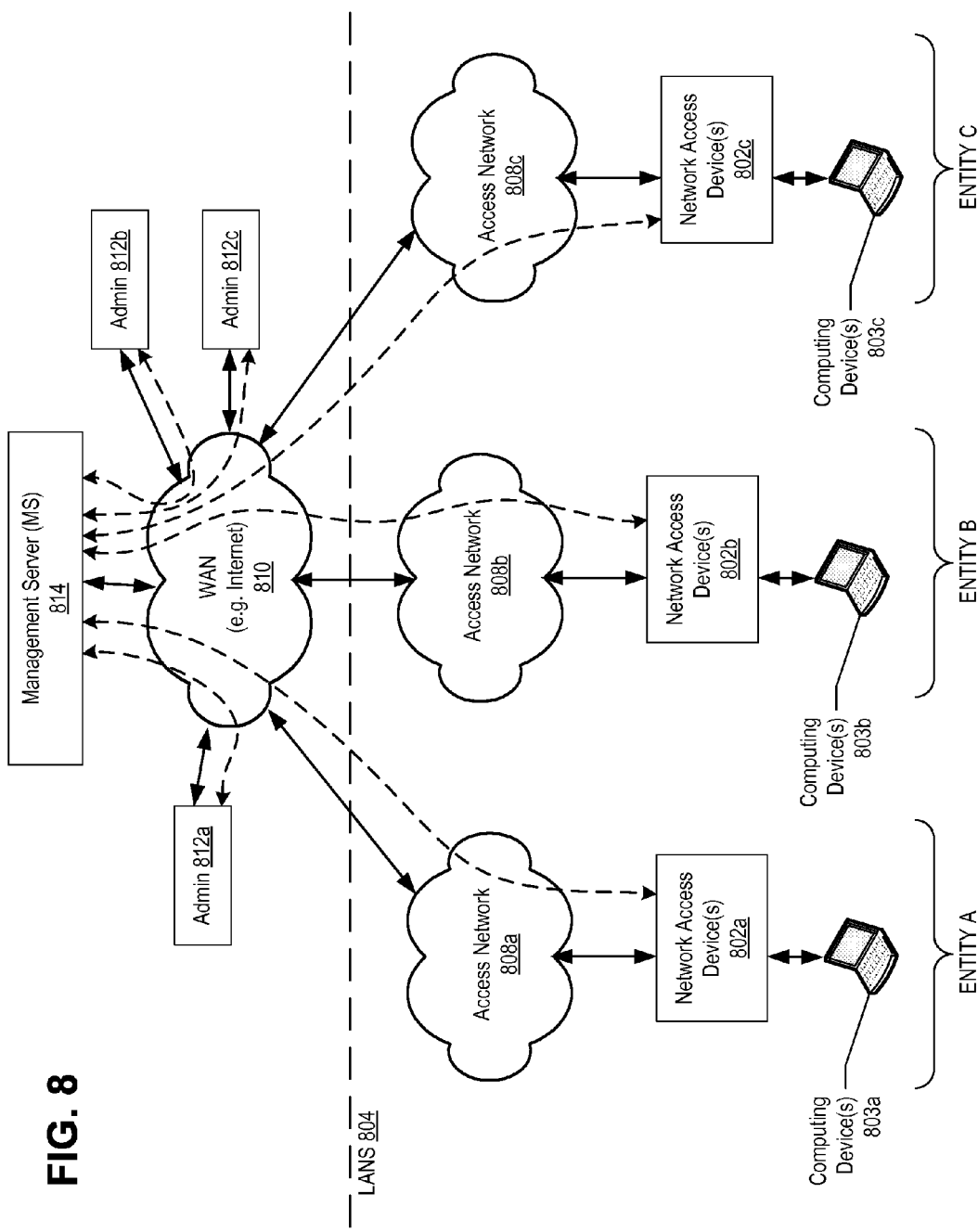
FIG. 8 is a block diagram illustrating several entities, their network configurations, and their connection(s) to a wide area network (WAN), in accordance with an embodiment of the invention.

Referring now to FIG. 8, a block diagram illustrating several entities (A-B), their networks, and their connection(s) to a WAN 810, in accordance with an embodiment of the invention, is shown. As shown in the embodiment of FIG. 8, entity A owns and operates a LAN that includes access network 808*a*, network access device(s) 802*a*, and computing device(s) 803*a*, while entity B owns and operates a LAN that includes access network 808*b*, network access device(s) 802*b*, and computing device(s) 803*b*, and entity C owns and operates a LAN that includes access network 808*c*, network access device(s) 802*c*, and network computing device 803*c*. NADs 802*a-c* may be any of the previously mentioned network access devices, includes NAD 100 and NAD 502. In the illustrated example, access networks 808*a-c* each include at least one network access device acting as a gateway to WAN 810. Thus, network access devices 802*a-c* are coupled behind (i.e., downstream) the respective network access devices acting as gateways within the respective access networks 808*a-c*; and thus network access devices 802*a-c* are intermediate nodes of their respective LANs.

For example, entity A may be a University or other educational institution, while entity B may be a privately/publicly held corporation. Even still, entity C could be a governmental organization. Thus, each entity may have one or more administrators (e.g., administrators 812*a-c*) who are tasked with the administration of their respective LAN. For example, administrator 812*a* may be tasked with configuration, management, and troubleshooting of entity A's network, while administrator 812*b* is tasked with the configuration, management, and troubleshooting of entity B's network. However, requiring a network administrator to physically travel to each network access device in their respective entity's LAN can be timely and expensive. Accordingly, a management server 814 is provided to allow for "cloud-based" management of an entity's network access devices (e.g., 808*a-c* and 802*a-c*). Thus, in the illustrated embodiment, management server 814 is multi-tenant, meaning that multiple organizations with different network administrators may have network access devices managed by the same management server 814. Therefore, management server 814 may be provided to allow Administrators 812*a-c* to manage their respective network access devices (e.g., 802*a-c*) even though the network access devices belong to separate and distinct entities.

Access networks 808*a-c* each represents various combinations of network access devices configured based on the needs of their respective entities. Changes in access network 808*a*, such as the removal, addition, or reconfiguration of a device within access network 808*a* may require a configuration change in network access device(s) 802*a*. Furthermore, configuration changes in one of network access device(s) 802*a*, itself, by remote network administrator 812*a* may cause that network access device 802*a* to lose its connection to WAN 810, preventing further access to that network access device 802*a* by network administrator 812*a*. Accordingly, embodiments of the invention allow for an installer to install NAD 802*a* by simply powering on the device and connecting a cable. Then, NAD 802*a* may automatically establish a connection to WAN 810, such that Administrator 812*a* may remotely configure NAD 802*a* by way of management server 814. Furthermore, as described above, network access device 802*a* may be configured to periodically test its connection to WAN 810 and if it is lost, to automatically establish a new connection to WAN 810, so as to reduce down time of the device.

Embodiments of the present disclosure may also allow a system administrator to intentionally misconfigure a network access device prior to deployment. For example, a system administrator may purchase or receive a network access device, in accordance with the embodiments discussed herein, where the system administrator statically configures the device with an IP configuration that is compatible with the network of the intended remote site, but incompatible with the local network where the system administrator is configuring the device. However, because the network access device is able to automatically establish a connection to the WAN, the system administrator may still be able to access and test the device locally before shipping the device to the remote location for final installation. Once installed in the remote location, the device may then revert to using the statically configured IP configuration stored by the system administrator. Accordingly, some embodiments of the presently disclosed network access devices (e.g., 100, 502, 802*a-c*) do not include a physical port that is solely dedicated for configuration of the device. Instead, the automatic establishment of a connection to the WAN by the network access devices herein may allow the NADs to be network managed devices only without the need for a dedicated physical configuration interface.

Figure 9:
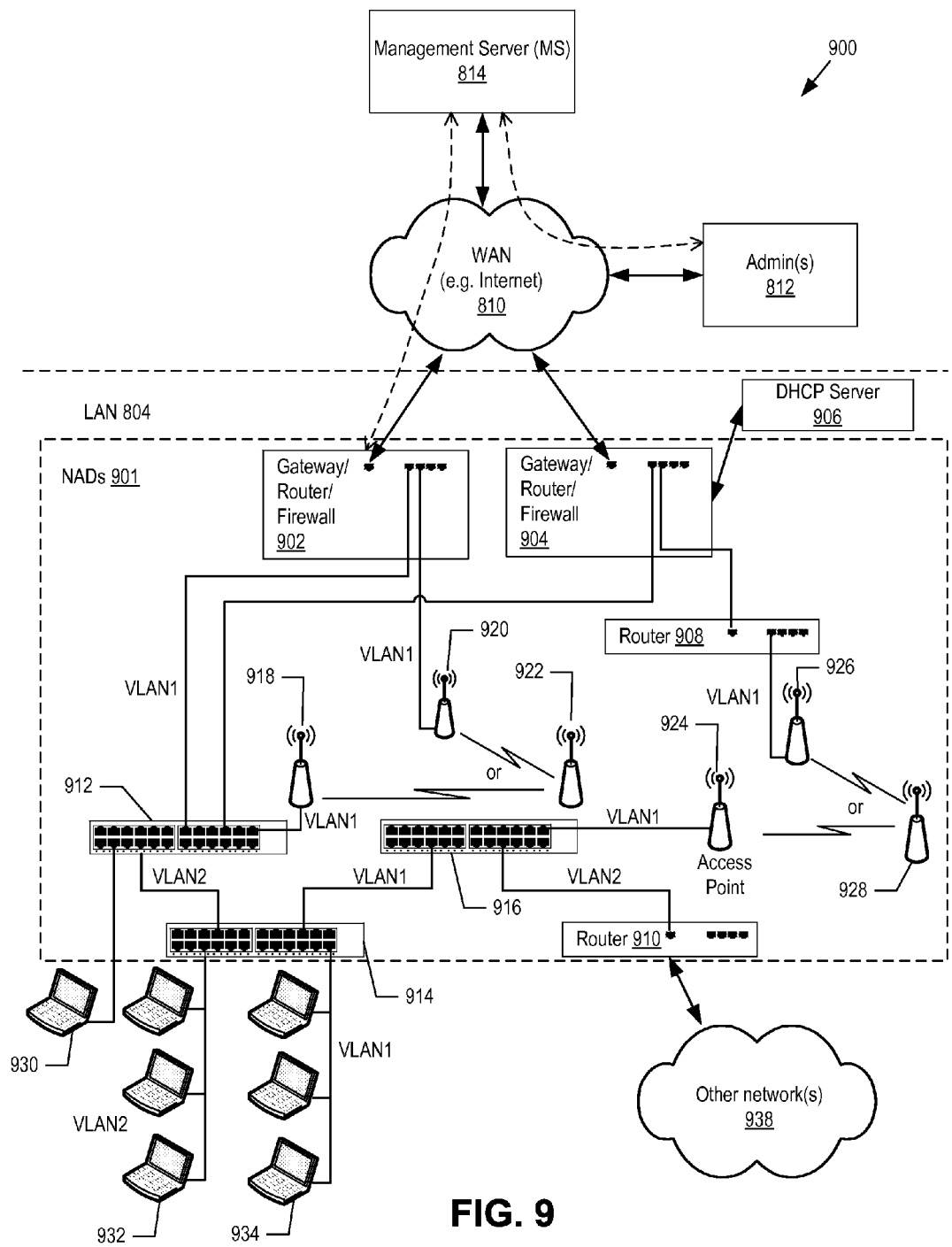
FIG. 9 is a block diagram illustrating a network configuration including several network access devices, in accordance with an embodiment of the invention.

FIG. 9 is a block diagram illustrating a network configuration 900 including several network access devices (NADs) 901, in accordance with an embodiment of the invention. The configuration of NADs 901 represents one possible implementation of one of the LANs 804, such as the one including access network 808*a* of FIG. 8, where one or more of NADs 901 are in accordance with embodiments of the present invention. That is, any of the routers (e.g., 902, 904, 908 and 910), network switches (e.g., 912-914), and wireless access points (e.g., 918-928) shown in FIG. 9 may be implemented by way of the previously described network access devices, including NAD 100 or NAD 502. FIG. 9 illustrates the complexity and variety of possible configurations that may need to be accounted for by a system administrator (e.g., admin 812) when configuring a network access device within LAN 804. For example, LAN 804 includes multiple gateways to WAN 810, multiple VLANs, and multiple possible paths to WAN 810 by many of the NADs 901. A change in one of the NADs 901 may require complex configuration changes to one or more of the downstream NADs. To be sure, a configuration change or fault in wireless access point 920 may result in required configuration changes to wireless access points 922 and 918, and network switches 912 and 914. Similarly, a configuration change or fault in router 908 may result in required configuration changes to wireless access points 926, 928, and 924, network switches 916 and 914, and router 910. As is apparent, manual configuration of the network access devices in a network such as LAN 804 can be complex and extremely error prone. Furthermore, changes to LAN 804 resulting is a loss of network connectivity may be difficult to diagnose and troubleshoot. Accordingly, embodiments of the present disclose allow for an installer to install one or more of NADs 901 by simply powering on the device and connecting a cable. Then, the NAD may automatically establish a connection to WAN 810, such that Administrator 812 may remotely configure NAD 802 by way of management server 814. Furthermore, NADs 901 may be configured to periodically test their connection to WAN 810 and if it is lost, to automatically establish a new connection to WAN 810, so as to reduce down time of LAN 804.

The order in which some or all of the process blocks appear in each process should not be deemed limiting. Rather, one of ordinary skill in the art having the benefit of the present disclosure will understand that some of the process blocks may be executed in a variety of orders not illustrated.

One or more parts of an embodiment of the invention may be implemented using different combinations of software, firmware, and/or hardware. Those part implemented in software/firmware are stored in a machine (e.g., computer) readable medium. That is, an electronic device (e.g., a NAD) stores and transmits (internally and/or with other electronic devices over a network) code (composed of software instructions) and data using machine-readable media, such as non-transitory tangible machine-readable media (e.g., machine-readable storage media such as magnetic disks; optical disks; read only memory; flash memory devices; phase-change memory) and transitory machine-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data). Thus, a non-transitory machine-readable medium of a given electronic device typically stores instructions for execution on one or more processors of that electronic device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
   testing a set of Internet Protocol (IP) configurations for establishing a connection from a first network access device to a wide area network (WAN), the first network access device being coupled behind a second network access device that acts as a gateway to the WAN, wherein each IP configuration of the set of IP configurations comprises a virtual local area network (VLAN) identifier (ID), a first IP address of the first network access device, a subnet mask, a second IP address of the second network access device, and a third IP address of a domain name system (DNS) server, and wherein testing the set of IP configurations comprises:
   prioritizing the set of IP configurations by assigning a score to the each IP configuration in the set of IP configurations according to a first priority scheme that assigns a higher score to a first type of IP configuration than a dynamically determined type of IP configuration,
   transmitting requests, each request of the requests being based on an IP configuration from the set of IP configurations, the requests being transmitted in sequence of priority as established by the prioritizing step for the set of IP configurations,
   tracking replies to the requests, the replies indicating which IP configurations of the set of IP configurations are valid, and
   based on the replies, removing any IP configurations found to be invalid from the set of IP configurations;
   updating the set of IP configurations by:
   prioritizing a set of VLAN IDs according to a second priority scheme that prioritizes a first type of VLAN ID over a second type of VLAN ID,
   transmitting dynamic host configuration protocol (DHCP) requests, each DHCP request of the DHCP requests being based on a VLAN ID from the set of VLAN IDs, the DHCP requests being transmitted in sequence of priority as established by the prioritizing step for the set of VLAN IDs,
   obtaining one or more DHCP leases in response to the DHCP requests,
   generating one or more additional IP configurations of the dynamically determined type based on the one or more DHCP leases, and
   adding the one or more additional IP configurations to the set of IP configurations; and
   while the testing step and the updating step are being performed in parallel, setting a currently best scoring IP configuration of the set of IP configurations according to the first priority scheme as a current IP configuration of the first network access device for communicating over the WAN.

2. The method of claim 1, wherein the one or more additional IP configurations are added to the set of IP configurations after the transmitting of the requests has begun.

3. The method of claim 2, wherein the requests based on IP configurations of the first type of IP configuration are transmitted while determining which IP configurations of the dynamically determined type of IP configuration are to be tested.

4. The method of claim 2, wherein the requests based on IP configurations of the dynamically determined type of IP configuration are transmitted while the one or more additional IP configurations of the dynamically determined type of IP configuration are added to the set of IP configurations.

5. The method of claim 1, wherein transmitting the DHCP requests comprises transmitting a DHCP request a predetermined time after sending a previous DHCP request and before a response to the previous DHCP request is expected to be received by the first network access device.

6. The method of claim 1, wherein the each request of the requests comprises an address resolution protocol (ARP) request for the first IP address of the first network access device in the IP configuration, and wherein testing the set of IP configurations further comprises determining that the IP configuration is valid when the first network access device receives an ARP reply to the ARP request.

7. The method of claim 1, wherein the each request of the requests comprises an ARP request for the second IP address to the second network access device, and wherein testing the set of IP configurations further comprises determining that the IP configuration is valid when the first network access device receives an ARP reply to the ARP request.

8. The method of claim 1, wherein the each request of the requests comprises a domain name system (DNS) request to a predetermined host coupled to the WAN, and wherein testing the set of IP configurations further comprises verifying a fourth IP address that is returned to the first network access device in response to the DNS request corresponds to the third IP address in the IP configuration.

9. The method of claim 8, wherein the first type of IP configuration is a statically configured type of IP configuration, and wherein the predetermined host is a management server coupled to the WAN for providing remote management of the first network access device over the WAN, the method further comprising transmitting data to the management server, the data indicating that the current IP configuration is not of the statically configured type of IP configuration.

10. The method of claim 1, wherein the first type of VLAN ID is a statically configured type of VLAN ID, and wherein the second priority scheme comprises transmitting a first DHCP request using a first VLAN ID of the statically configured type of VLAN ID before transmitting a second DHCP request using a second VLAN ID of the second type of VLAN ID.

11. The method of claim 10, wherein the second type of VLAN ID is a native type of VLAN ID.

12. The method of claim 10, wherein the second type of VLAN ID is a predetermined common type of VLAN ID.

13. The method of claim 1, wherein the first type of IP configuration is a statically configured type of IP configuration, and wherein the first priority scheme comprises testing a first IP configuration of the statically configured type IP configuration before testing a second IP configuration of non-statically configured type of IP configuration.

14. The method of claim 1, wherein the first type of IP configuration is a statically configured type of IP configuration, and wherein a first IP configuration of the statically configured type of IP configuration is scored higher than a second IP configuration of non-statically configured type of IP configuration.

15. The method of clam 1, further comprising:
testing the current IP configuration to determine whether the current IP configuration is a valid IP configuration; and
when the current IP configuration is determined to be invalid, replacing the current IP configuration with a next best scoring IP configuration determined to be valid.

16. A first network access device, to be coupled behind a second network access device acting as a gateway to a wide area network (WAN), the first network access device comprising:
a configuration module for automatically establishing a connection to the WAN by testing a set of Internet Protocol (IP) configurations according to a first priority scheme that assigns a higher score to a first type of IP configuration than a dynamically determined type of IP configuration each IP configuration of the set of IP configurations comprising a virtual local area network (VLAN) identifier (ID), an IP address for the first network access device, a subnet mask, an IP address of the second network access device, and an IP address of a domain name system (DNS) server;
an IP configuration client coupled to the configuration module, the IP configuration client being configured to:
transmit requests, each request of the requests being based on an IP configuration from the set of IP configurations, the requests being transmitted in sequence of priority as established by the first priority scheme,
track replies to the requests, the replies indicating which IP configurations of the set of IP configurations are valid, and
set a currently best scoring IP configuration of the set of IP configurations according to the first priority scheme as a current IP configuration of the first network access device for communicating over the WAN; and
a dynamic host configuration protocol (DHCP) client coupled to the configuration module, wherein the DHCP client and the IP configuration client operate concurrently, the DHCP client being configured to:
prioritize a set of VLAN IDs according to a second priority scheme that prioritizes a first type of VLAN ID over a second type of VLAN ID,
transmit DHCP requests, each DHCP request of the DHCP requests being based on a VLAN ID from the set of VLAN IDs, the DHCP requests being transmitted in sequence of priority as established by the second priority scheme,
obtain one or more DHCP leases in response to the DHCP requests,
generating one or more additional IP configurations of the dynamically determined type of IP configuration based on the one or more DHCP leases, and
adding the one or more additional IP configurations to the set of IP configurations to be tested by the IP configuration client.

17. The first network access device of claim 16, wherein the one or more additional IP configurations are added to the set of IP configurations after the IP configuration client has begun transmitting the requests.

18. The first network access device of claim 17, wherein the IP configuration client is further configured to transmit the requests based on IP configurations of the first type of IP configuration, while the DHCP client determines which IP configurations of the dynamically determined type of IP configuration are to be tested.

19. The first network device of claim 17, wherein the IP configuration client is further configured to transmit the requests based on IP configurations of the second type of IP configuration while the DHCP client adds the one or more additional IP configurations of the dynamically determined type of IP configuration to the set of IP configurations.

20. The first network access device of claim 16, wherein transmitting the DHCP requests comprises transmitting a DHCP request a predetermined time after sending a previous DHCP request and before a response to the previous DHCP request is expected to be received by the first network access device.

21. The first network access device of claim 16, wherein the each request of the requests comprises an address resolution protocol (ARP) request for the IP address of the first network access device in the IP configuration, and wherein the IP configuration client is further configured to determine that the IP configuration is valid when the first network access device receives an ARP reply to the ARP request.

22. The first network access device of claim 16, wherein the each request of the requests comprises an ARP request to the second network access device, and wherein the IP configuration client is further configured to determine that the IP configuration is valid when the first network access device receives an ARP reply to the ARP request.

23. The first network access device of claim 16, wherein each request of the requests comprises a domain name system (DNS) request to a predetermined host coupled to the WAN, and wherein the IP configuration client is further configured

19 to verify an IP address that is returned to the first network access device in response to the DNS request is a correct IP address.

24. The first network access device of claim 23, wherein the first type of IP configuration is a statically configured type of IP configuration, and wherein the predetermined host is a management server coupled to the WAN for providing remote management of the first network access device over the WAN, the configuration module further configured to transmit data to the management server, the data indicating that the current IP configuration is not of the statically configured type IP configuration.

25. The first network access device of claim 16, wherein the first type of VLAN ID is a statically configured type of VLAN ID, and wherein the second priority scheme comprises transmitting a first DHCP request using a first VLAN ID of the statically configured type of VLAN ID before transmitting a second DHCP request using a second VLAN ID of the second type of VLAN ID.

26. The first network access device of claim 16, wherein the second type of VLAN ID is a native type of VLAN ID.

27. The first network access device of claim 16, wherein the second type of VLAN ID is a predetermined common type of VLAN ID.

28. The first network access device of claim 16, wherein the first type of IP configuration is a statically configured type of IP configuration, and wherein the first priority scheme comprises testing a first IP configuration of the statically configured type of IP configuration before testing a second IP configuration of non-statically configured type of IP configuration.

29. The first network access device of claim 16, wherein the first type of IP configuration is a statically configured type of IP configuration, and wherein the IP configuration client assigns a higher score to a first IP configuration of the statically configured type of IP configuration than a second IP configuration of non-statically configured type of IP configuration.

30. The first network access device of clam 16, wherein the IP configuration client is further configured to:
test the current IP configuration to determine whether the current IP configuration is a valid IP configuration; and
when the current IP configuration is determined to be invalid, replace the current IP configuration with a next best scoring IP configuration.

31. The first network access device of claim 16, wherein the first network access device includes a router.

32. The first network access device of claim 16, wherein the first network access device includes a wireless access point.

33. A non-transitory computer-readable medium storing instructions which, when executed by a first network access device which is coupled behind a second network access device acting as a gateway to a wide area network (WAN), cause the first network access device to perform operations comprising:
testing a set of Internet Protocol (IP) configurations for establishing a connection from the first network access device to the WAN, wherein each IP configuration of the set of IP configurations comprises a virtual local area network (VLAN) identifier (ID), an IP address for the first network access device, a subnet mask, an IP address of the second network access device, and an IP address of a domain name system (DNS) server, and wherein testing the set of IP configurations comprises:
prioritizing the set of IP configurations by assigning a score to the each IP configuration in the set of IP configurations according to a first priority scheme that assigns a higher score to a first type of IP configuration than a dynamically determined type of IP configuration,
transmitting requests, each request of the requests being based on an IP configuration from the set of IP configurations, the requests being transmitted in sequence of priority as established by the first priority scheme, and
tracking replies to the requests, the replies indicating which IP configurations of the set of IP configurations are valid;
updating the set of IP configurations by:
prioritizing a set of VLAN IDs according to a second priority scheme that prioritizes a first type of VLAN ID over a second type of VLAN ID,
transmitting dynamic host configuration protocol (DHCP) requests, each DHCP request of the DHCP requests being based on a VLAN ID from the set of VLAN IDs, the DHCP requests being transmitted in sequence of priority as established by the second priority scheme,
obtaining one or more DHCP leases in response to the DHCP requests,
generating an additional IP configuration of the dynamically determined type based on the one or more DHCP leases, and
adding the additional IP configuration to the set of IP configurations; and
while the testing step and the updating step are being performed concurrently, setting a currently highest scoring IP configuration of the set of Ip configurations as a current IP configuration of the first network access device for communicating over the WAN.

34. The non-transitory computer-readable medium of claim 33, wherein the additional IP configuration of the dynamically determined type to IP configuration is added to the set of IP configurations after the transmitting of the requests has begun.

35. The non-transitory computer-readable medium of claim 34, wherein the requests based on IP configurations of the first type of IP configuration are transmitted while determining which IP configurations of the dynamically determined type of IP configuration are to be tested.

36. The non-transitory computer-readable medium of claim 34, wherein the requests based on IP configurations of the dynamically determined type of IP configuration are transmitted while the one or more additional IP configurations of the dynamically determined type of IP configuration are added to the set of IP configurations.

37. The non-transitory computer-readable medium of claim 33, wherein transmitting the DHCP requests comprises transmitting a DHCP request a predetermined time after sending a previous DHCP request and before a response to the previous DHCP request is expected to be received by the first network access device.

* * * * *